US009800937B2

(12) United States Patent
Newell et al.

(10) Patent No.: US 9,800,937 B2
(45) Date of Patent: *Oct. 24, 2017

(54) SYSTEMS AND METHODS FOR INTERRUPTED PROGRAM RECORDING

(71) Applicant: EchoStar Technologies L.L.C., Englewood, CO (US)

(72) Inventors: Nicholas Newell, Highlands Ranch, CO (US); Ryan Gorsuch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,528

(22) Filed: Feb. 4, 2016

(65) Prior Publication Data

US 2016/0156984 A1 Jun. 2, 2016

Related U.S. Application Data

(63) Continuation of application No. 14/200,186, filed on Mar. 7, 2014, now Pat. No. 9,258,599, which is a continuation of application No. 12/423,647, filed on Apr. 14, 2009, now Pat. No. 8,670,650.

(51) Int. Cl.
| | |
|---|---|
| *H04N 5/76* | (2006.01) |
| *H04N 21/472* | (2011.01) |
| *H04N 5/782* | (2006.01) |
| *H04N 21/235* | (2011.01) |
| *H04N 21/433* | (2011.01) |
| *H04N 21/434* | (2011.01) |
| *H04N 21/435* | (2011.01) |
| *H04N 9/79* | (2006.01) |

(52) U.S. Cl.
CPC ....... *H04N 21/47214* (2013.01); *H04N 5/782* (2013.01); *H04N 9/79* (2013.01); *H04N 21/235* (2013.01); *H04N 21/435* (2013.01); *H04N 21/4334* (2013.01); *H04N 21/4348* (2013.01)

(58) Field of Classification Search
CPC ................................................ H04N 21/47214
USPC ........................................................ 386/298
See application file for complete search history.

(56) References Cited

U.S. PATENT DOCUMENTS 9,258,599 B2 * 2/2016 Newell ................... H04N 5/782

* cited by examiner

*Primary Examiner* — Hung Dang
*Assistant Examiner* — Girumsew Wendmagegn

(57) ABSTRACT

Program recording systems and methods are operable to adjust recording times of a program of interest in response to an occurrence of an interrupting program that alters the scheduled recording times of the program of interest. An exemplary embodiment receives an unscheduled program flag (UPF) corresponding to an occurrence of an unscheduled program; adjusts at least one of a scheduled recording start time associated with the program of interest to an updated record start time and a scheduled recording end time associated with the program of interest to an updated record end time in response to receiving the UPF; and records the program of interest based upon at least one of the updated record start time and the updated record end time.

20 Claims, 5 Drawing Sheets

SYSTEMS AND METHODS FOR INTERRUPTED PROGRAM RECORDING

PRIORITY CLAIM

This patent application is a Continuation of U.S. Non-Provisional patent application Ser. No. 14/200,186, filed Mar. 7, 2014, published as U.S. Publication No. 2014/0189746, entitled "SYSTEMS AND METHODS FOR INTERRUPTED PROGRAM RECORDING," and issued as U.S. Pat. No. 9,258,599 on Feb. 9, 2016, which is a Continuation of U.S. Non-Provisional patent application Ser. No. 12/423,647, filed Apr. 14, 2009, published as U.S. Publication No. 2010/0260473, entitled "SYSTEMS AND METHODS FOR INTERRUPTED PROGRAM RECORDING," and issued as U.S. Pat. No. 8,670,650 on Mar. 11, 2014, the content of which are herein incorporated by reference in their entirety.

BACKGROUND

Media devices receive programming from a media provider, and based upon a viewer's selection of a program of interest, stream the selected program of interest to a display which presents the selected program of interest to the viewer. An exemplary media device is a set top box (STB) that receives programming from a cable system media provider or a satellite system media provider. The media device may include its own display or be coupled to an external display, such as a television (TV). Thus, the viewer may select a movie of interest by inputting appropriate instructions to their STB. The movie is then presented on the viewer's TV.

Some media devices include a recording functionality. For example, a STB may include an internal digital video recorder (DVR) which, based upon the viewer's instructions, records selected programs of interest when they are available at the STB. The recording may occur while the viewer is concurrently viewing the program of interest on their TV, or may independently record the selected program of interest while the viewer is away or while the viewer is watching a different program. Other media devices may be coupled to other memory media and record selected programs of interest in accordance with the viewer's instructions. Examples of such other recordable media include digital video disks (DVDs), video cassette recorders (VCRs), and other suitable external memory media. In some instances, the media recording device is external to the media device.

Recording of a program of interest is typically based upon the scheduled start time and the scheduled end time of the program of interest. Thus, the media device monitors real time with the scheduled start time of the program of interest. When the scheduled start time arrives, the media device selects the program of interest from the available programming and begins recording. For example, the STB may first tune itself to receive the channel that is providing the program of interest. Then, the STB starts the recording of the program of interest. However, this process presumes that the program of interest is actually presented on that channel based on available program scheduling information. Recording ends when the scheduled end time arrives.

However, there are many situations where the media device will not record the entirety of the program of interest. For example, the program of interest may be a sporting event that does not finish at the scheduled end time due to one or more overtime periods. Here, the media device would end the recording of the sporting event at the scheduled end time, and therefore fail to record the overtime periods. Some media devices attempt to address such issues by extending the recording beyond the scheduled end time by some predefined amount of time. However, there is no guarantee that sufficient time extensions to the recording will be made so that all of the sporting event is recorded. Further, if the sporting event ends early, or ends at the scheduled end time, memory capacity of the recording media is unnecessarily utilized to store the extended time recording.

As another example, the program of interest may be interrupted by an unscheduled program, such as an emergency program or a high-priority program that was not previously scheduled. For example, a government official may be making a speech or the like that is important to the public. Thus, current programming may be interrupted on one or more channels so that the government official's speech is sent to the media device. As another example, a public emergency or news event may occur. The media provider may interrupt the current program to present a newscast or the like pertaining to the public emergency or news event.

In some situations, the interrupted program of interest, or a portion thereof, may be canceled. Accordingly, subsequently scheduled programming will not be impacted. That is, their scheduled start times and scheduled end times remain valid.

However, in some situations, presentation of the current program of interest will be delayed by the duration of the unscheduled program. That is, if presentation of the interrupted current program is delayed, its actual end time will occur after its scheduled end time. Since the media device cannot know that there is an interruption, and that the actual end time of the current program of interest will occur after the scheduled end time, the media device will fail to record the end of the program of interest since its record end time has been preset to the original scheduled end time of the program of interest.

Further, if the interruption delays the current programming, all subsequently scheduled programming on that channel will be impacted. That is, all subsequent programming (at least up through some selected reconciliation time) will have their respective scheduled start times and scheduled end times changes by the duration of the interruption. As an example, if the unscheduled program interruption occurs from 6:00 p.m. to 6:20 p.m., a program of interest on that channel originally scheduled to start at 8:00 p.m., and originally scheduled to end at 10:00 p.m., will actually start at 8:20 p.m. and end at 10:20 p.m. due to the unscheduled program interruption. Accordingly, if the viewer had previously set their media device to record the program of interest on that channel (from 8:00 p.m. through 10:00 p.m.), then the last 20 minutes of the program of interest will not have been recorded.

Accordingly, there is a need to coordinate program recordings with unexpected programming end time extensions, unexpected programming interruptions, and unexpected programming delays.

SUMMARY

Program recording systems and methods are operable to adjust recording times of a program of interest in response to an occurrence of an interrupting program that alters the scheduled recording times of the program of interest are disclosed. An exemplary embodiment receives an unscheduled program flag (UPF) corresponding to an occurrence of an unscheduled program; adjusts at least one of a scheduled recording start time associated with the program of interest to an updated record start time and a scheduled recording end time associated with the program of interest to an updated record end time in response to receiving the UPF; and records the program of interest based upon at least one of the updated record start time and the updated record end time.

In accordance with further aspects, an exemplary embodiment comprises a program content stream interface configured to receive a program stream with at least a program of interest therein and at least an unscheduled program flag (UPF) corresponding to an occurrence of an unscheduled program; an interface configured to receive a request to record the program of interest; a recording medium communicatively coupled to the program content stream interface, and configured to record at least the program of interest; and a processor system communicatively coupled to the recording medium, and configured to adjust at least one of a scheduled recording start time associated with the program of interest to an updated record start time and a scheduled recording end time associated with the program of interest to an updated record end time in response to receiving the UPF. The program of interest is recorded based upon at least one of the updated record start time and the updated record end time.

BRIEF DESCRIPTION OF THE DRAWINGS

Preferred and alternative embodiments are described in detail below with reference to the following drawings.

DETAILED DESCRIPTION

Figure 1:
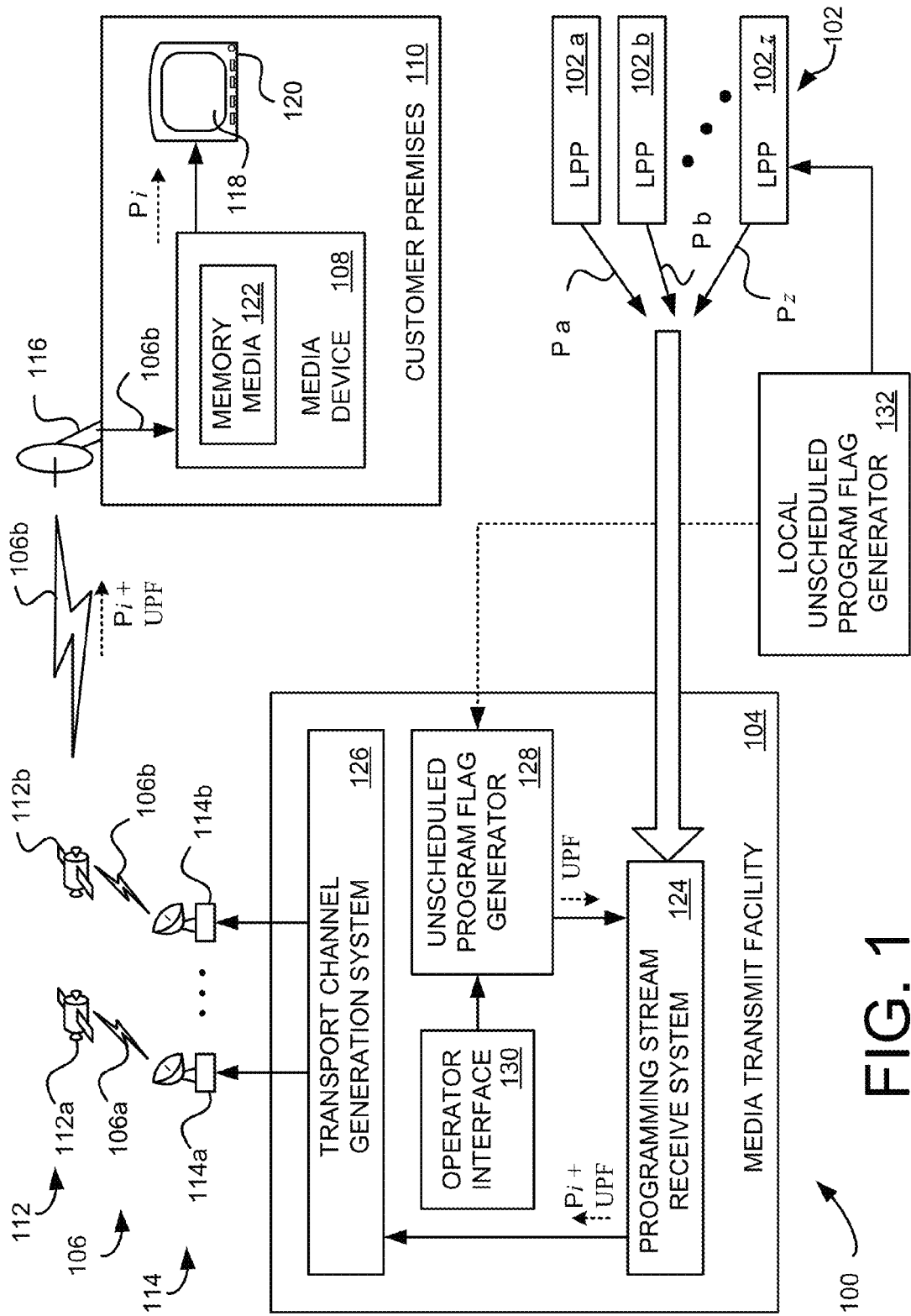
FIG. 1 is a block diagram of an embodiment of a record schedule control system.

FIG. 1 is a block diagram of an exemplary embodiment of a program record schedule system 100. The program record schedule system 100 is operable to adjust a predefined recording schedule for a program of interest in response to an occurrence of an interrupting program that alters scheduled recording times of the program of interest.

In overview, a plurality of programs are provided by a plurality of local programming providers 102 (LPPs 102a-102z). The programs Pa-Pz are communicated to a media transmit facility 104 operated by a media provider. The programs Pa-Pz are bundled into a transport channel 106 which is communicated to a viewer's media device 108 at a customer premises 110.

An exemplary media provider provides programming to its customers via a plurality of satellites 112. The transport channel 106 is uplinked to each satellite 112 through a corresponding transmit antenna 114. The respective transport channel 106 is then communicated from the satellite 112 down to a receiver antenna 116 at the customer premises 110. For example, selected ones of the programs Pa-Pz that are bundled into the transport channel 106b are uplinked from the transmit antenna 114b to the satellite 112b, and then communicated from the satellite 112b to the receiver antenna 116. The transport channel 106b is then received by the media device 108. The receiver antenna 116 may be configured to receive multiple transport channels 106.

Other media providers may provide programming to their customers via other types of communication systems. For example, some media providers may use a cable network or the Internet to provide programming to their customers. Embodiments of the record schedule control system 100 may be configured to operate over any suitable type of communications system.

A program of interest Pi may be selected by a viewer who provides suitable instructions to the media device 108. The program of interest Pi is identified by its particular "channel" in the received transport channel 106. The media device 108 tunes itself to the particular channel on which the program of interest Pi is available, and then retrieves the selected program of interest Pi from the transport channel 106. The program of interest Pi is then presented on a display 118. For example, but not limited to, the media device 108 may be a set top box (STB) that is coupled to a suitable media presentation device 120, such as a television (TV), personal computer (PC) or the like. Or, the display 118 may be a component of the media device 108.

In some situations, the program of interest Pi may be selected for recording by the viewer who provides suitable program recording instructions to the media device 108. When the program of interest Pi becomes available in the transport channel 106, the program of interest Pi is stored (recorded) into a suitable memory medium 122.

In some situations, the program of interest Pi may be currently available in the transport channel 106 such that the recording of the program of interest Pi begins immediately. Recording of the program of interest Pi ends with the scheduled record end time occurs.

In other situations, the program of interest Pi may be available from the transport channel 106 at a future time. Accordingly, the media device 108 defines a scheduled record start time and a scheduled record end time for the program of interest Pi. Recording of the program of interest Pi begins when the scheduled record start time occurs, and ends when the scheduled record end time occurs.

However, in some situations an unscheduled program may interrupt the program of interest Pi that is currently available in the transport channel 106. Accordingly, the end of the current program of interest Pi may be delayed. In other situations, the unscheduled program may delay the future scheduling of the program of interest Pi. That is, the unscheduled program precedes the program of interest Pi that has been scheduled for future recording. Accordingly, if the original scheduled record start time and scheduled record end time of the program of interest Pi are used for recording, a portion of the program of interest Pi (or possibly the entire program of interest Pi) will not be recorded.

As an example, the unscheduled program may be provided by the media provider. Examples of an unscheduled program include, but are not limited to, a politician's speech or a news cast covering a current event of interest. The unscheduled program interrupts the program of interest Pi that is currently being recorded (and/or being presented to the viewer). The unscheduled program interrupts the scheduled record start time and/or the scheduled record end time. That is, the scheduled record start time and/or the scheduled record end time of the program of interest Pi will be changed.

Embodiments ensure complete recording of the program of interest Pi in one or more manners. An exemplary embodiment records the unscheduled program and adjusts the actual record end time to substantially coincide with the actual end time of the program of interest Pi by adding the duration of the unscheduled program to the scheduled record end time. Another embodiment halts the recording such that the unscheduled program is not recorded, and then restarts the recording of the program of interest Pi upon the conclusion of the unscheduled program. Another embodiment records the unscheduled program along with the entire program of interest Pi, and additionally inserts suitable markers denoting the start and end of the unscheduled program so that a viewer may optionally choose to view the unscheduled program, or may choose to skip the unscheduled program. In yet another embodiment, during playback of the program of interest Pi, presentation of the unscheduled program is omitted, and the unscheduled program is separately available for later viewing.

If the unscheduled program is inserted into the transport channel 106 prior to a future scheduled program of interest Pi, the availability of the program of interest Pi in the transport channel 106 may be delayed (by substantially the duration of the unscheduled program). Embodiments of the record schedule control system 100 receive information indicating a delay caused by the unscheduled program, and accordingly, adjust the scheduled record start and end times to substantially coincide with the new actual start and end time of the delayed program of interest Pi. Accordingly, the program of interest Pi is recorded when it becomes available in the transport channel 106.

In yet other situations, a program of interest Pi may run longer than anticipated, thereby delaying the end of the program of interest Pi. A sporting event may be a non-limiting example of a program that has a delayed ending that goes beyond its original scheduled program end time. The sporting event may have one or more unscheduled overtime periods of play to determine the winner of the sporting event. If the scheduled record end time is based upon the scheduled program end time of the sporting event, the end of the sporting event will not be recorded. Embodiments of the record schedule control system 100 receive information indicating an extension of the program end time, and accordingly, adjust the actual record end time to substantially coincide with the actual end time of the sporting event. Thus, the entire sporting event will be recorded for later viewing.

An exemplary embodiment of the record schedule control system 100 includes, at the media transmit facility 104, a programming stream receive system 124, a transport channel generation system 126, and an unscheduled program flag generator 128. The programming stream receive system 124 is any suitable system that receives a plurality of programs, typically in a streaming fashion, from the plurality of local program providers 102. The programming stream receive system 124 may reside within the media transmit facility 104, as illustrated in FIG. 1, or portions of the programming stream receive system 124 may be external to the media transmit facility 104. Some programming stream receive systems 124 may be distributed over very large geographic regions, and/or may use a variety of communication media to receive the programs.

The programming stream receive system 124 prepares the received plurality of programs in a format that is suitable for communication to the transport channel generation system 126. The transport channel generation system 126 bundles the received programs on a selective basis and generates one or more transport channels 106. In some embodiments, the programming stream receive system 124 and the transport channel generation system 126 are integrated into a larger system that manages programming.

A video program, such as a movie, television program, newscast or the like, typically includes various components that are concurrently multiplexed into the transport channel 106 such that the program components can be assembled by the media device 108 for presentation to a viewer. Examples of the program components include a video portion (a series of images that are serially presented to appear to a viewer as a video), an audio portion (where sounds are provided which communicate audio information sequenced with the presented video), and/or a closed caption stream (where text is provided that corresponds to the audio portion). Some systems may include a meta data portion which provides supplemental information associated with the program. Often, the program components are digitized, and then packetized into packet streams, to facilitate multiplexing a plurality of programs into the transport channel 106. The packet streams may include the meta data, or may include additional supplemental information pertaining to the program.

The unscheduled program flag generator 128, in response to the presence of an unscheduled program, generates an unscheduled program flag (UPF). The UPF provides information that enables the media device 108 to adjust recording start and/or end times such that a program of interest Pi is recorded when it becomes available in the received transport channel 106.

The UPF is added to, inserted within, or otherwise communicated with, the transport channel 106. The UPF may be separately communicated in the transport channel 106, or may be communicated as part of a current program that is in the transport channel 106. For example, one embodiment embeds the UPF into the closed captioning stream of a program that is interrupted by the unscheduled program. Alternatively, or additionally, the UPF can be embedded in the video portion, the audio portion, and/or the meta data portions of a program.

It is appreciated that an unscheduled program may interrupt a current program provided by a single local program provider 102, a plurality of selected program providers 102, or all of the program providers 102. Further, as used herein, an unscheduled extension of a current program is defined as an unscheduled program.

The UPF is periodically communicated in the transport channel 106 once the unscheduled program begins. In an exemplary embodiment, the periods between the serially communicated UPF is predefined, but is preferably relatively short. As long as the unscheduled program is interrupting the current program, the UPF includes sufficient information to enable the media device 108 to adjust the recording start and/or end time such that a program of interest Pi is recorded when it becomes available in the received transport channel 106. For example, one embodiment of the UPF includes the start time of the unscheduled program and current duration information for the unscheduled program. When the unscheduled program has finished, the UPF may include the start and end times of the unscheduled program, or may include the start time and total duration of the unscheduled program, or may include the total duration of the unscheduled program.

In some embodiments, the unscheduled program flag generator 128 resides remotely from the media transmit facility 104. The UPF is associated with, or combined into, the stream of programming associated with the channel that is broadcasting the unscheduled program. If the unscheduled program is broadcast by multiple local programming providers 102, the UPF is associated with, or combined into, each of the streams of programming associated with the channel provided by those particular local programming providers 102. Thus, the insertion of the UPF into a programming stream is locally controlled at the local programming provider's facilities. Additionally, or alternatively, the UPF can be inserted at the source of the unscheduled program, or may be inserted at another suitable point along the communication path to the media transmit facility 104.

Alternatively, or additionally, the UPF is communicated in the transport channel 106 as a separate stream of information which identifies the particular channels that are broadcasting the unscheduled program. Thus, if the unscheduled program only affects a limited number of program channels, the identification of the affected channels can be included in the UPF. If many channels are affected, such an embodiment provides the advantage of being able to identify many channels, or all channels, as being affected by the UPF, in contrast to many UPFs which must be individually inserted into the individual programs.

The presence of the unscheduled program may be detected, determined, or known in a variety of manners. In an exemplary embodiment, the unscheduled program flag generator 128 monitors programs being provided by the local programming providers 102. Since the programming schedule is predefined, deviations in the provided programming from the scheduled programming indicates the broadcast of an unscheduled program. Such an embodiment monitors meta data provided for a received stream of programming. The meta data may include a suitable identifier, such as a program title or the like, which identifies the current received program.

In such an embodiment, the programming schedule information may be stored in a suitable media (not shown) at the media transmit facility 104 which is accessible by the unscheduled program flag generator 128. For example, the programming schedule may be the information that is periodically communicated to the media device 108 so that an electronic program guide (EPG) or the like can be generated and displayed to a viewer. Thus the title of the currently available program can be compared to the title of the scheduled program. If the titles become different, the program record schedule system 100 detects the occurrence of the unscheduled program.

Additionally, or alternatively, an operator interface 130 or the like is integrated into, or coupled to, the unscheduled program flag generator 128. An operator who is monitoring programming may manually initiate the process of generating the series of unscheduled program flags (UPFs). The unscheduled program flag (UPF) can then be inserted into a suitable portion of the transport channel 106. Upon conclusion of the unscheduled program, the operator may then indicate the end of the unscheduled program.

Additionally, or alternatively, a local unscheduled program indicator 132 or the like may be available at the LPPs 102. The local unscheduled program indicator 132 may communicate information to the unscheduled program flag generator 128 to initiate generation of the UPF. In some embodiments, the unscheduled program indicator 132 may itself generate UPFs and place them into the program stream that is communicated to the programming stream receive system 124. Thus, the individual LPPs 102 may monitor their own programming, and manually or automatically generate information that indicates the broadcasting of the unscheduled program by their station. Upon conclusion of the unscheduled program, the LPPs 102 may then indicate the end of the unscheduled program.

Figure 2:
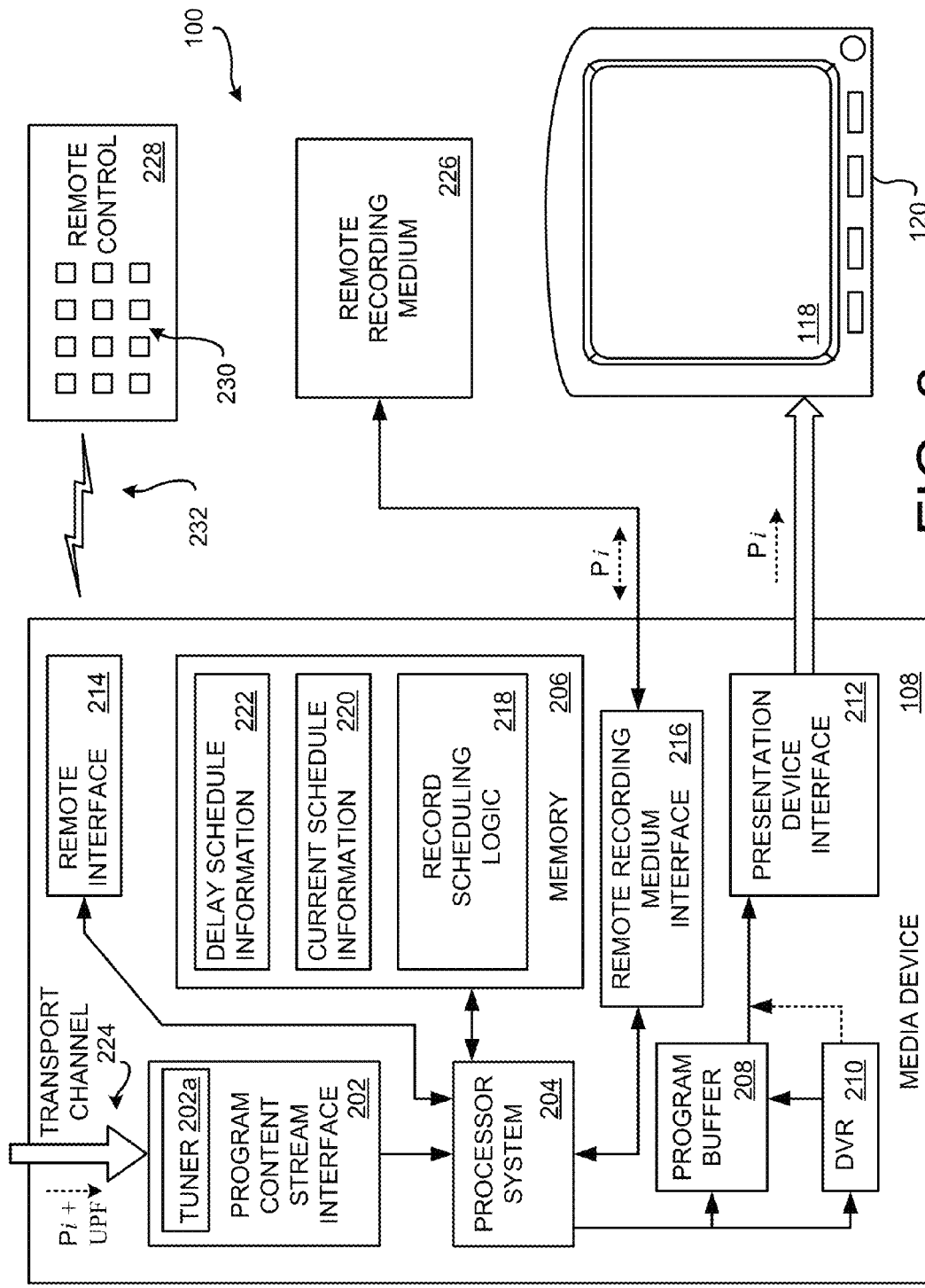
FIG. 2 is a block diagram of an embodiment of the record schedule control system in a media device.

FIG. 2 is a block diagram of an embodiment of the record schedule control system 100 in the media device 108. Examples of the media device 108 include, but are not limited to, a set top box (STB). Embodiments of the record schedule control system 100 may be implemented in other media devices, such as, but not limited to, stereos, radios, televisions (TVs), digital video disc (DVD) players, digital video recorders (DVRs), or personal computers (PCs).

The non-limiting exemplary media device 108 comprises a program content stream interface 202, a processor system 204, a memory 206, a program buffer 208, an optional digital video recorder (DVR) 210, a presentation device interface 212, a remote interface 214, and an optional remote recording medium interface 216. The memory 206 comprises portions for storing the record scheduling logic 218, the current schedule information 220, and optionally, the delay schedule information 222. Other media devices may include some, or may omit some, of the above-described media processing components. Further, additional components not described herein may be included in alternative embodiments.

The functionality of the media device 108, here a set top box, is now broadly described. One or more transport channels 224 are received by the program content stream interface 202. One or more tuners 202a in the program content stream interface 202 selectively tune to one of the transport channels 224 in accordance with instructions received from the processor system 204. The transport channel 224 typically comprises a plurality of programs multiplexed together. The processor system 204, based upon a request for a program of interest Pi specified by the viewer, parses out program content associated with the program of interest Pi. The program of interest Pi is then assembled into a stream of video and/or audio information which may be saved into the program buffer 208 such that the program content can be streamed out to the media presentation device 120, via the presentation device interface 212. Alternatively, or additionally, the parsed out program content may be saved into the DVR 210 for later presentation.

Some embodiments are communicatively coupled to a remote recording medium 226, via the remote recording medium interface 216. Thus, a program of interest Pi may be communicated to and recorded by the remote recording medium 226.

A viewer (not shown) may select a program of interest Pi for recording. That is, based upon the viewer's instructions, the media device 108 can then control various media components and/or devices, such as the DVR 210 and/or the remote recording medium 226, in accordance with the determined viewer commands. For example, but not limited to, the media device 108 may be configured to receive commands from a viewer via an optional remote control 228. The remote control 228 includes one or more controllers 230. The viewer, by actuating one or more of the controllers 230, causes the remote control 228 to generate and transmit instructions, via a wireless signal 232, to the remote interface 214 to control operation of the media device 108.

For example, the viewer may wish to view the current schedule of programs that are available for viewing, either currently or in the future. The viewer may generate an instruction, via the remote control 228, requesting presentation of a program schedule and program information shown by way of a displayed electronic program guide (EPG). From time to time, information populating the current schedule information 220 portion of the memory 206 is communicated to the media device 108, via the transport channel 224 or via another suitable media and is stored into the current schedule information 220 portion of the memory 206. The information may include, but is not limited to, a scheduled presentation start and/or end time, a program channel, and descriptive information. The program's descriptive information may include a title of the program, names of performers or actors, date of creation, and a summary describing the nature of the program. Any suitable information may be included in the program's descriptive information. Upon receipt of an instruction from the viewer requesting presentation of an EPG, the information in the current schedule information 220 is retrieved, formatted, and then presented on the display 118 as an EPG.

When an unscheduled program interrupts a currently available program, an UPF in the transport channel 224 is received by the media device 108. The record scheduling logic 218, being executed by the processor system 204 in an exemplary embodiment, checks the current schedule information for the presence of any recording activities currently underway, or scheduled at a future time.

In the event that a recording of a currently available program of interest Pi is underway, the recording is interrupted by the occurrence of an unscheduled program. The record schedule control system 100 operates to adjust recording start and/or end times such that the program of interest Pi is recorded when it becomes available in the received transport channel 224. The program recording schedule adjustments are made in accordance with the received UPF.

Figure 3:
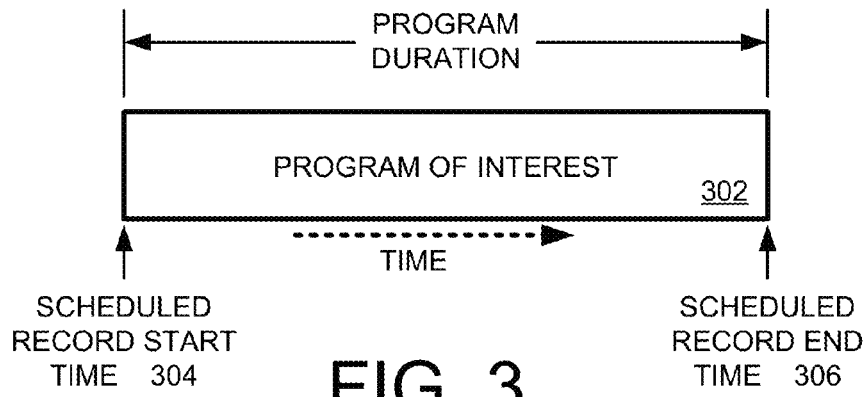
FIG. 3 is a conceptual diagram of a streaming program of interest showing a scheduled record start time and a scheduled record end time defined by the record schedule control system.

A variety of exemplary, non-limiting program recording scenarios are proved to illustrate exemplary operation of embodiments of the record schedule control system 100. FIG. 3 is a conceptual diagram of an uninterrupted streaming program of interest 302 showing a scheduled record start time 304 and a scheduled record end time 306 defined by the record schedule control system 100. Here, it is assumed that there is no occurrence, or prior occurrence, of an unscheduled program that would otherwise interrupt and/or delay the program of interest 302.

The scheduled record start time 304 corresponds to the time that the program of interest 302 is received by, or is available from, the media device 108. The scheduled record end time 306 corresponds to the time that the program of interest 302 is scheduled to end. Thus, recording is initiated at the scheduled record start time 304 by tuning the program content stream interface 202 to receive the channel that is providing the program of interest 302, and then communicating the program of interest 302 to the DVR 210 and/or the remote recording medium 226 for recording. The recording of the program of interest 302 concludes at the scheduled record end time 306.

Figure 4:
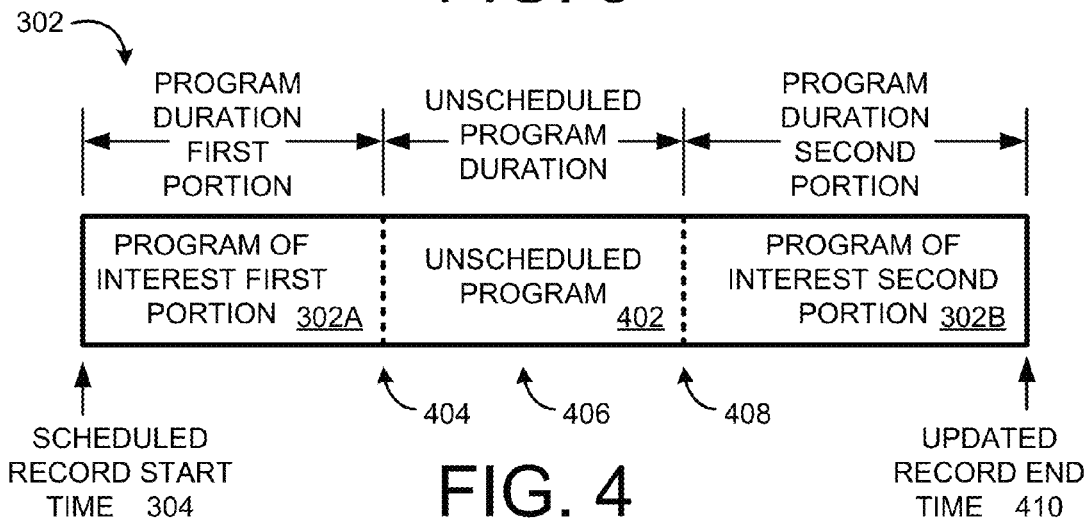
FIG. 4 is a conceptual diagram of the streaming program of interest interrupted by an unscheduled program and showing an updated record end time defined by the record schedule control system.

FIG. 4 is a conceptual diagram of the streaming program of interest 302 that is interrupted by an unscheduled program 402. Here, recording of the streaming program of interest 302 starts at the scheduled record start time 304. At a time 404, the unscheduled program 402 begins and interrupts the streaming program of interest 302. The unscheduled program 402 continues for a duration 406, and ends a time 408 (wherein the duration 406 is defined by the start time 404 and the end time 408 of the unscheduled program 402). After conclusion of the unscheduled program 402, the streaming program of interest 302 restarts. That is, the streaming program of interest 302 has been delayed by the occurrence of the unscheduled program 402. Embodiments of the program record schedule system 100 adjust the originally scheduled record end time 306 (FIG. 3) to an updated record end time 410 so that recording of the streaming program of interest 302 restarts.

Thus, the streaming program of interest 302 is defined by a program of interest first portion 302A and a program of interest second portion 302B. The program of interest first portion 302A is defined by the scheduled record start time 304 of the streaming program of interest 302 and the start time 404 of the unscheduled program 402. The program of interest second portion 302B is defined by the end time 408 of the unscheduled program 402 and the updated record end time 410.

In some situations, the unscheduled program 402 is a continuation of the streaming program of interest 302 that is being recorded. For example, the streaming program of interest 302 may be a sporting event. If the sporting event does not conclude at the originally scheduled record end time 306, such as during one or more overtime periods that must be played to determine a winner of the sporting event, recording of the sporting event should continue. By defining the extended play of the streaming program of interest 302 as an unscheduled program 402 (wherein the start of the unscheduled program 402 begins at a time that corresponds to the scheduled record end time 306), recording continues uninterrupted.

The duration of the unscheduled program 402 corresponds to the duration of overtime periods of the sporting event. Once a winner of the sporting event is determined, the sporting event ends. The end of the sporting event corresponds to the updated record end time 410 of the streaming program of interest 302. Thus, embodiments of the program record schedule system 100 determine the updated record end time 410 based upon the actual time of conclusion of the streaming program of interest 302, and then ends the recording (at the updated record end time 410). Thus, the entire streaming program of interest 302 is recorded.

In some embodiments, the unscheduled program 402 is also recorded. Thus, a time marker or the like may be optionally inserted into the recording to identify the occurrence of the unscheduled program 402, which began at the time 404. Upon conclusion of the unscheduled program 402, at time 408, another marker can be optionally inserted into the recording. When a viewer is replaying the recorded streaming program of interest 302, and the unscheduled program 402 is reached, the start time 404 (identified by the start marker) and end time 408 (identified by the end marker) of the unscheduled program 402 can be used to provide viewing alternatives to the viewer. For example, the viewer may elect to jump ahead in the programming viewing to the time 408 corresponding to the conclusion of the unscheduled program 402, and continue their viewing of the recorded streaming program of interest 302 (thereby skipping the unscheduled program 402).

In other embodiments, before the viewer is presented with the playing of their recorded streaming program of interest 302, information may be presented to the viewer indicating that one or more unscheduled programs 402 occurred during the recording. The viewer may optionally select to skip over the unscheduled program 402. In other situations, the viewer may elect to skip forward to view the recorded unscheduled program 402. (For example, the unscheduled program 402 may be a newscast pertaining to a significant event of interest that the viewer is interested in viewing.)

Figure 5:
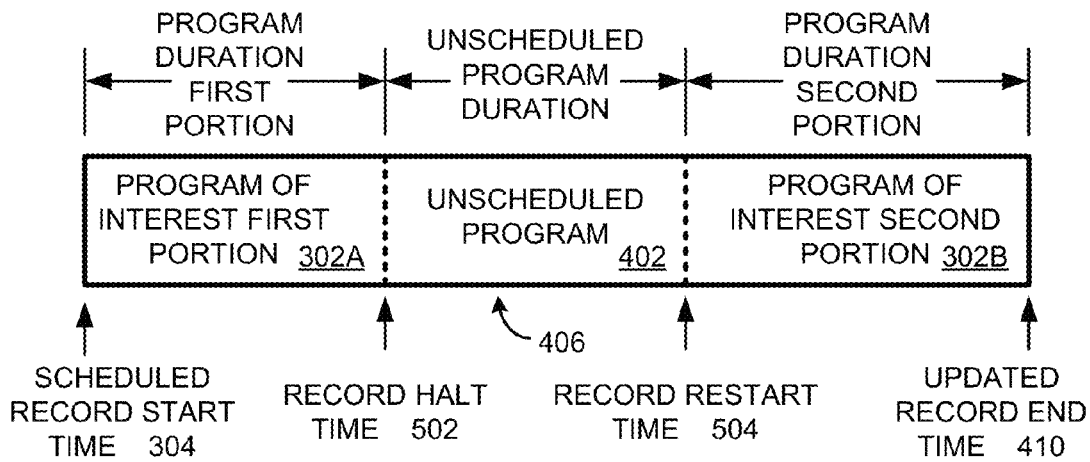
FIG. 5 is a conceptual diagram of the streaming program of interest interrupted by the unscheduled program and showing an unscheduled record halt time, an updated record restart time, and the updated record end time.

In some embodiments, the unscheduled program 402 may not be recorded. Rather, the recording of the streaming program of interest 302 halts, and then restarts upon conclusion of the unscheduled program 402. FIG. 5 is a conceptual diagram of the streaming program of interest 302 that is interrupted by the unscheduled program 402. Here, recording of the streaming program of interest 302 starts at the scheduled record start time 304. The unscheduled program 402 begins and interrupts the streaming program of interest 302. The program recording process halts at a record halt time 502. The unscheduled program 402 continues for a duration 406, and then ends. Recording restarts at a record restart time 504. Accordingly, after conclusion of the unscheduled program 402, the recording of the streaming program of interest 302 restarts and continues up through the updated record end time 410.

Figure 6:
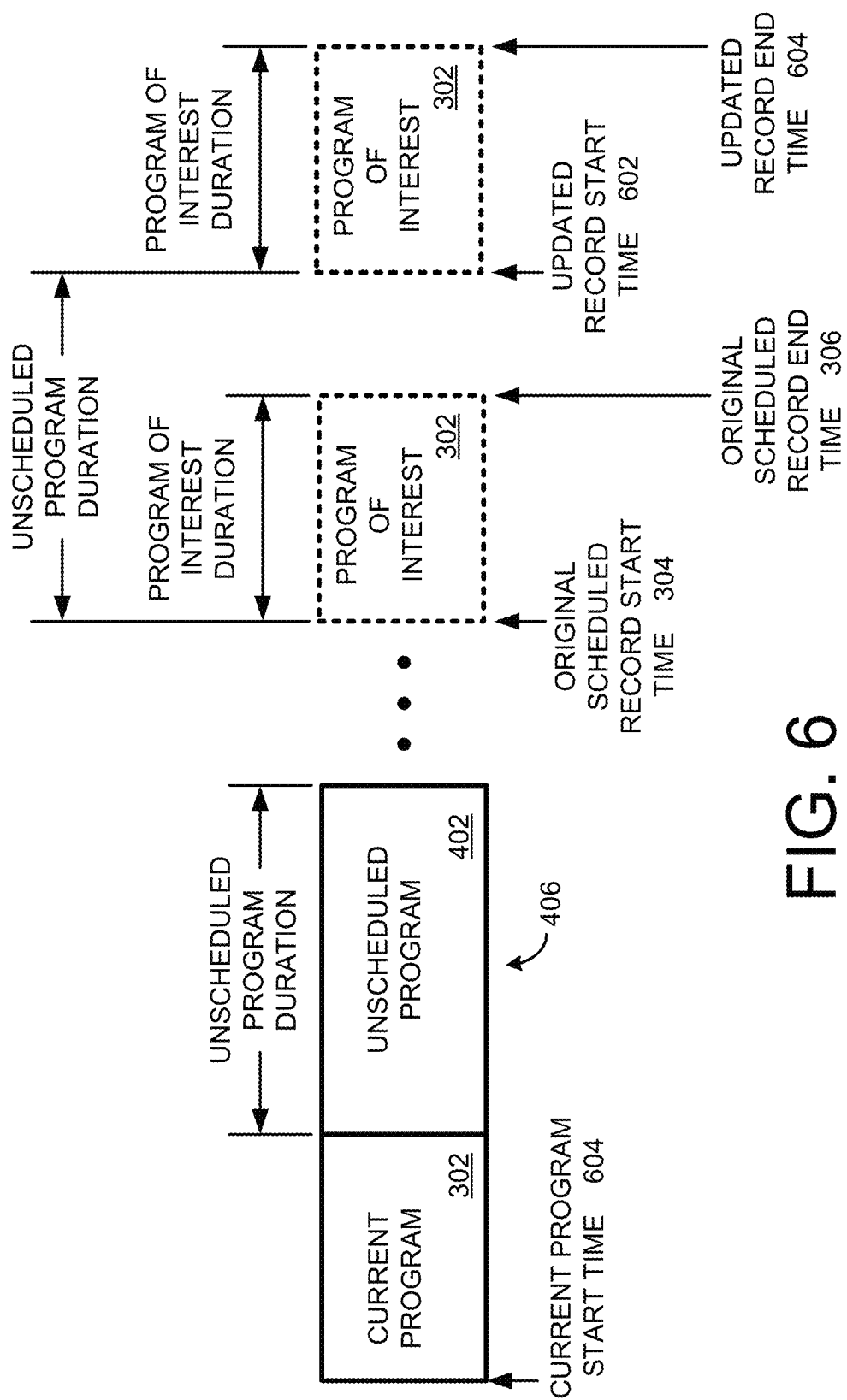
FIG. 6 is a conceptual diagram of the streaming program of interest delayed by a previous unscheduled program and showing the updated record start time and the updated record end time.

In other situations, the unscheduled program 402 begins and ends prior to the originally scheduled record times of the streaming program of interest 302. FIG. 6 is a conceptual diagram of the streaming program of interest 302 delayed by a previous unscheduled program 402 and showing an updated record start time 602 and an updated record end time 604 defined by the record schedule control system 100.

Here, all subsequent programming that is scheduled after the unscheduled program 402 is delayed by at least the duration 406 of the unscheduled program 402. For example, an important politician may give a speech (the unscheduled program 402) that interrupts programming across the country. Accordingly, all subsequent programming is delayed the duration of the politician's speech (the unscheduled program duration 406).

For example, the politician's speech may run for fifteen minutes. If, at a later time, a particular streaming program of interest 302 is originally scheduled to being at 8:00 p.m. (original scheduled record start time 304) and end at 9:00 p.m. (original scheduled end time 306), the streaming program of interest 302 by fifteen minutes. That is, because of the delay caused by the politician's speech, the program of interest 302 would be rescheduled to start at 8:15 p.m. (updated record start time 602) and end at 9:15 (updated record end time 604). Thus, embodiments of the program record schedule system 100 begin recording at the updated record start time 602 (at 8:15 p.m.) and end recording at the updated record end time 604 (at 9:15 p.m.) such that the entire streaming program of interest 302 is recorded.

Figure 7:
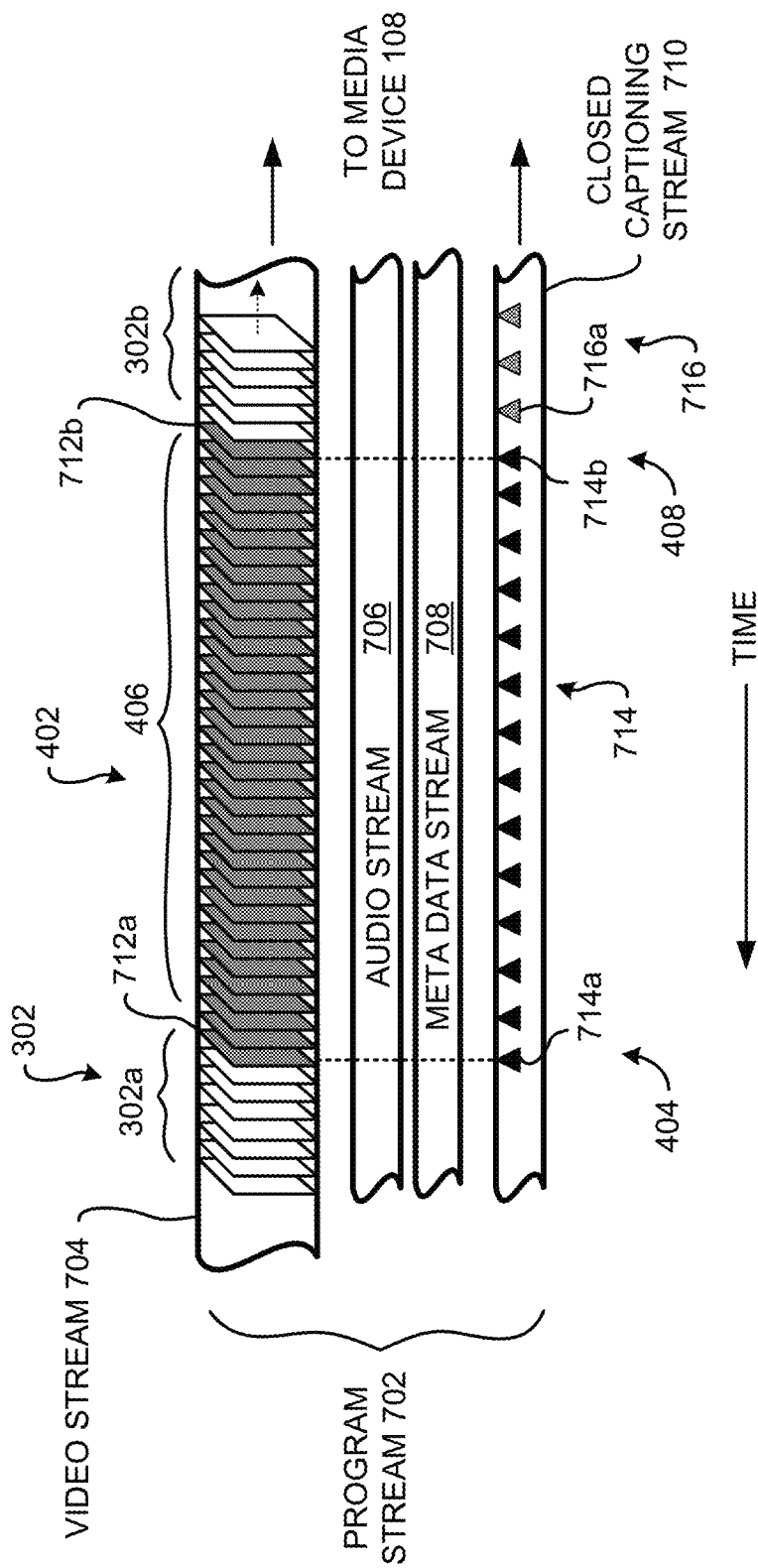
FIG. 7 conceptually illustrates a program stream received by an embodiment of the program record schedule system.

FIG. 7 conceptually illustrates a program stream 702 received by an embodiment of the program record schedule system 100. The program stream 702 includes a video stream 704, a corresponding audio stream 706, a corresponding meta data stream 708, and a corresponding closed captioning stream 710. The video stream 704 is comprised of a plurality of serially sequenced video frames 712, each having a particular image of a program. The video frames 712 are serially presented so as to create a moving picture. The audio stream 706 may include spoken words, music, and background sounds. The audio stream 706 is sequenced with the video frames 712 such that spoken words, music, and background sounds of the audio stream 706 correspond in time with the moving picture. The meta data stream 708 contains other information of interest.

The closed captioning stream 710 is also conceptually illustrated as part of the program stream 702. The closed captioning stream 710 is typically a textual presentation of the words of the audio stream 706. The textual presentation is provided for hearing impaired viewers or for viewers in an area with relatively loud ambient noise levels, such as a bar or the like. The words of the closed captioning stream 710 are sequenced so as to generally correspond to the spoken words of the audio stream 706.

In an exemplary embodiment of the program record schedule system 100, a plurality of UPF 714 are embedded in at least one of the video stream 104, the corresponding audio stream 706, the corresponding meta data stream 708, and/or the corresponding closed captioning stream 710 at predefined intervals. In response to detecting a UPF 714 in the presented program stream 702, the program record schedule system 100 redefines recording start times and recording end times so that the streaming program of interest 302 is recorded when it becomes available.

Here, the unscheduled program 402 begins at time 404 with a first video frame 712a (and associated with audio information in the audio stream 706, associated with meta data in the meta data stream 708, and/or associated with closed captioning information in the closed captioning stream 710). A first UPF 714a is inserted into the closed captioning stream 710 by the exemplary embodiment of the program record schedule system 100. The first UPF 714a (and subsequent UPFs 714) are generated and inserted into the program stream 702 prior to reception at the media device 108 (FIGS. 1 and 2).

Upon detection of the first UPF 714a, depending upon the embodiment, recording of the streaming program of interest 302 may be halted, recording may continue so as to record the unscheduled program 402, or a marker or the like may be inserted into the recording to denote the beginning of the unscheduled program 402.

The unscheduled program 402 continues for a duration 406, and ends at time 408. During the unscheduled program 402, a periodic series of UPFs 714 are inserted into the program stream 702. Accordingly, if a viewer tunes to the channel that the unscheduled program 402 is being presented, the program record schedule system 100 will understand that the unscheduled program 402 is currently interrupting the streaming program of interest 302. Thus, if the viewer wishes to record the streaming program of interest 302 (or the remaining part of the streaming program of interest 302), the program record schedule system 100 can appropriately adjust recording start and end times in view of the interrupting unscheduled program 402.

During the unscheduled program 402, the inserted UPFs 714 may comprise a variety of information, including, but not limited to, the start time 404 of the unscheduled program 402 and a current time or the like so that the current duration 406 of the unscheduled program 402 is determinable.

The unscheduled program 402 ends at time 408 with a last video frame 712b. Upon conclusion of the unscheduled program 402 at time 408, a UPF 714b is inserted into the program stream 702 to indicate the end of the unscheduled program 402. Upon detection of the UPF 714b, depending upon the embodiment, recording of the streaming program of interest 302 may be restarted, recording may continue so as to record the second portion 302b of the streaming program of interest 302, or a marker or the like may be inserted into the recording to denote the end of the unscheduled program 402.

After conclusion of the unscheduled program 402, embodiments of the program record schedule system 100 continue to periodically insert UPFs 716 into the program stream 702. For example, the UPF 716a follows the UPF 714b. The UPFs 716 indicate that the unscheduled program 402 has caused a delay in the availability of subsequent programs. Thus, when a viewer requests that a program of interest be recorded, the originally scheduled start and end times can be adjusted to the updated record start time 602 and the updated record end time 604 (FIG. 6).

At some point in time, a scheduling reconciliation occurs such that subsequently scheduled programming is returned to its originally scheduled times. For example, if the duration of the unscheduled program 402 is one hour, then a program having a duration of one hour is canceled. Thus, programs that are after the canceled program will be available at their scheduled times. Preferably, the reconciliation occurs at a non-peak viewing time (such as very early in the morning), or when a low-interest program is scheduled.

In alternative embodiments, the UPFs 714, 716 may be inserted into, embedded in, or included with one or more of the video stream 704, the audio stream 706, the meta data stream 708, and/or the closed captioning stream 710. For example, the UPFs 714, 716 may be in a MPEG PSI (Program Specific Information) tables, such as, but not limited to, a PAT (Program Association Table), a PMT (Program Map Table), a CAT (Conditional Access Table), a TSDT (Transport Stream Description Table), and/or Private Sections. The UPFs 714, 716 may be in an ASTC (Advanced Television Systems Committee) PSIP (Program and System Information Protocol) tables, such as, but not limited to, a STT (System Time Table), a RRT (Rating Region Table), a DCCT (Directed Channel Change Table), a MGT (Master Guide Table), a DCCSCT (Directed Channel Change Select Code Table), an ETT (Extended Text Table), an EIT (Event Information Table), a CVCT (Cable Virtual Channel Table), and/or a TVCT (Terrestrial Virtual Channel Table). The UPFs 714, 716 may be in a DVB (Digital Video Broadcast) SI (Service Information) tables, such as, but not limited to, a NIT (Network Information Table), a SDT (Service Description Table), an EIT (Event Information Table), a BAT (Bouquet Association Table), a SIT (Selection Information Table), a RST (Running Status Table), a TOT (Time Offset Table), and/or a TDT (Time and Date Table). In other embodiments, the UPFs 714, 716 may be communicated to the media device 108 in other manners, such as by a separate transmission of information.

It should be emphasized that the above-described embodiments of the program record schedule system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
  a program content stream interface configured to receive at least one program stream with a plurality of programs therein that are each uniquely identified by a title, wherein the plurality of programs are serially received in accordance with a broadcast schedule defined by a start time and an end time predefined for each of the plurality of programs, and wherein the title, start time and end time for each of the plurality of programs is indicated in an electronic program guide (EPG) stored at the media device;
  a memory that stores recording information identifying a program of interest selected for recording, wherein the recording information associated with the program of interest is defined by at least a recording start time and a recording end time; and
  a processor system communicatively coupled to at least the program content stream interface, wherein the processor system is configured to:
    compare a title of a program being currently received at the program content stream interface with a title of a program currently scheduled for presentation as indicated in the EPG,
  wherein the media device receives, at the program content stream interface, an unscheduled program flag defining a duration of an unscheduled program, and
  wherein in response to the title of the currently received program being different from the title of the program currently scheduled for presentation, the processor system is further configured to adjust at least one of:
    the recording start time for the program of interest to an updated recording start time based on the duration of the unscheduled program as defined by the unscheduled program flag, and
    the recording end time for the program of interest to an updated recording end time based on the duration of the unscheduled program as defined by the unscheduled program flag.

2. The media device of claim 1, further comprising:
  a first interface communicatively coupling the media device to a display, wherein the processor system is further configured to generate and communicate, via the first interface, the EPG to the display for presentation to a user of the media device; and
  a second interface configured to receive a request from the user to record the program of interest, wherein the program of interest is selected by the user via the presented EPG.

3. The media device of claim 2, wherein the EPG indicates the title, the start time and the end time for each of the plurality of programs, and wherein the stored EPG was received at the media device prior to receiving the unscheduled program flag such that the start times and the end times for each of the plurality of programs has not been adjusted by the duration defined by the unscheduled program flag.

4. The media device of claim 2, wherein the unscheduled program flag is received before the request from the user to record the program of interest is received, and wherein the processor system is further configured to:
  store at least the duration of the unscheduled program as defined by the unscheduled program flag into the memory,
  wherein the recording start time and the recording end time for the program of interest are then updated based on the duration of the unscheduled program as defined by the unscheduled program flag.

5. The media device of claim 2, wherein the unscheduled program flag is received before the request from the user to record the program of interest is received, and wherein the processor system updates the recording start time and the recording end time for the program of interest based on the duration in response to receiving the unscheduled program flag.

6. The media device of claim 1, wherein the unscheduled program flag with the duration resides in meta data of the currently received program.

7. The media device of claim 1, wherein the plurality of programs in the received program stream are packetized into packets of data communicated in a packet stream, and wherein the unscheduled program flag is separately communicated in the packet stream with the currently received program.

8. The media device of claim 1, wherein the plurality of programs in the received program stream are packetized into packets of data communicated in a packet stream, and wherein the unscheduled program flag is communicated in at least one packet of the currently received program.

9. The media device of claim 1, wherein the program of interest is currently being received in the at least one program stream prior to receiving the unscheduled program flag, and where in response to receiving the unscheduled program flag while the program of interest is being recorded, the processor system is further configured to:
halt the recording of the program of interest; and
restart the recording of the program of interest upon a conclusion of the unscheduled program,
wherein the recording end time for the program of interest is adjusted to the updated recording end time based on the duration after the conclusion of the unscheduled program.

10. The media device of claim 1, wherein the program of interest is currently being received in the at least one program stream prior to receiving the unscheduled program flag, and where in response to receiving the unscheduled program flag while the program of interest is being recorded, the processor system is further configured to:
insert a first marker into the recording of the program of interest to identify the interruption of the program of interest by the unscheduled program;
continue the recording, wherein the recording includes the unscheduled program;
insert a second marker into the recording at the conclusion of the unscheduled program of the program of interest upon a conclusion of the unscheduled program; and
resume the recording of the program of interest upon the conclusion of the unscheduled program,
wherein the recording end time for the program of interest is adjusted to the updated recording end time based on the duration after the conclusion of the unscheduled program.

11. The media device of claim 10, wherein the processor system is further configured to:
retrieve the recorded program of interest, wherein the recorded program of interest is presented to a user from its start;
continue presentation of the program of interest until the first marker;
skip over presentation of the unscheduled program to the second marker; and
resume presentation of the program of interest from the second marker.

12. The media device of claim 10, wherein the unscheduled program is a delayed ending of the program of interest that is scheduled for recording, wherein the processor system is further configured to:
continue the recording, wherein the recording includes the unscheduled program; and
halt the recording of the program of interest upon a conclusion of the unscheduled program,
wherein the halting of recording occurs at a time that corresponds to the recording end time of the program of interest plus the duration of the unscheduled program as defined by the unscheduled program flag.

13. The media device of claim 1, further comprising:
a remote recording medium interface configured to communicate the program of interest to a remote recording medium for recording.

14. A method, comprising:
currently receiving a program, at a media device, in a program stream;
comparing, at the media device, a title of the currently received program with a title of a program currently scheduled for presentation or recording as indicated in previously received programming schedule information associated with an electronic program guide (EPG), wherein the title, a start time and an end time of the program scheduled for presentation or recording are indicated in the stored previously received programming schedule information;
receiving, at the media device, an unscheduled program flag with information defining a duration of an unscheduled program; and
adjusting, in response to the title of the currently received program being different from the title of the program scheduled for presentation or recording, at least one of:
a recording start time for the program of interest to an updated recording start time based on the duration, and
a recording end time for the program of interest to an updated recording end time based on the duration.

15. The method of claim 14, wherein the unscheduled program flag is received before a request from a user to record the program of interest is received at the media device, and further comprising:
storing at least the duration of the unscheduled program as defined by the unscheduled program flag into a memory of the media device,
wherein the recording start time and the recording end time for the program of interest are then updated based on the duration of the unscheduled program as defined by the unscheduled program flag.

16. The method of claim 14, wherein the unscheduled program flag is received before a request from a user to record the program of interest is received, and further comprising:
updating the recording start time and the recording end time for the program of interest based on the duration in response to receiving the unscheduled program flag.

17. The method of claim 14, wherein the program of interest is currently being received in the at least one program stream prior to receiving the unscheduled program flag, and where in response to receiving the unscheduled program flag while the program of interest is being recorded, the method further comprising:
halting the recording of the program of interest; and
restarting the recording of the program of interest upon a conclusion of the unscheduled program,
wherein the recording end time for the program of interest is adjusted to the updated recording end time based on the duration after the conclusion of the unscheduled program.

18. The method of claim 14, wherein the program of interest is currently being received in the at least one program stream prior to receiving the unscheduled program flag, and where in response to receiving the unscheduled program flag while the program of interest is being recorded, the method further comprising:
inserting a first marker into the recording of the program of interest to identify the interruption of the program of interest by the unscheduled program;

continuing the recording, wherein the recording includes the unscheduled program;

inserting a second marker into the recording at the conclusion of the unscheduled program of the program of interest upon a conclusion of the unscheduled program; and resuming the recording of the program of interest upon a conclusion of the unscheduled program, wherein the recording end time for the program of interest is adjusted to the updated recording end time based on the duration after the conclusion of the unscheduled program.

19. The method of claim 18, further comprising:

retrieving the recorded program of interest, wherein the recorded program of interest is presented to the user from its start;

continuing presentation of the program of interest until the first marker;

skipping over presentation of the unscheduled program to the second marker; and resuming presentation of the program of interest from the second marker.

20. The method of claim 14, wherein the received program in the program stream is packetized into packets of data communicated in a packet stream, and wherein the unscheduled program flag is separately communicated in the packet stream with the currently received program.

\* \* \* \* \*